May 11, 1943.   L. G. SPETH   2,319,015
VALVE COUPLING
Filed Feb. 11, 1941

INVENTOR
LLOYD G. SPETH
BY
ATTORNEY

Patented May 11, 1943

2,319,015

UNITED STATES PATENT OFFICE 2,319,015

VALVE COUPLING

Lloyd G. Speth, East Cleveland, Ohio, assignor to The Cleveland Pneumatic Tool Company, Cleveland, Ohio, a corporation of Ohio Application February 11, 1941, Serial No. 378,437

4 Claims. (Cl. 284—19)

This invention relates broadly to a pipe or hose coupling, but more particularly to a self-sealing coupling capable upon disconnection to automatically close the ends of fluid conduits or lines on which it is installed.

One object of this invention is to produce a pipe or hose coupling capable of automatically and positively closing the ends of fluid conduits during and subsequent to their disconnection, thereby enabling the quick and effective replacement of fluid actuated mechanisms or power units to which fluid conduits are connected without necessitating the drainage of the conduits before disconnection and their repriming after connection.

Another object of this invention is to produce an improved self-sealing coupling of simple construction through which pipe lines or the like may readily be coupled or uncoupled without danger of admitting air in the system.

Other objects more or less ancillary to the foregoing reside in the specific construction and aggroupment of the elements peculiar to this structure, as will become apparent from a more complete examination of this specification.

Figure 1:
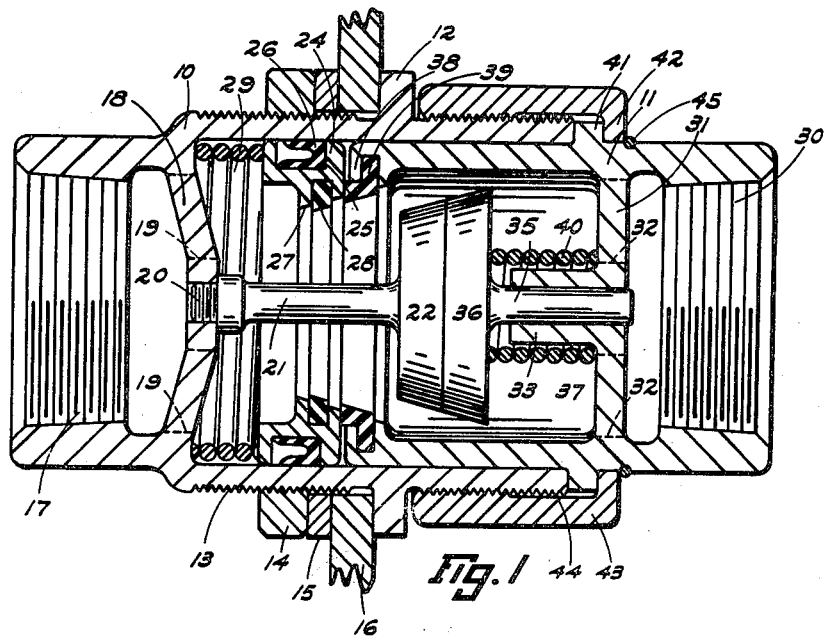
Fig. 1 is a longitudinally cross sectional view of the improved coupling shown in connected or operative position.
Figures 2, 3:
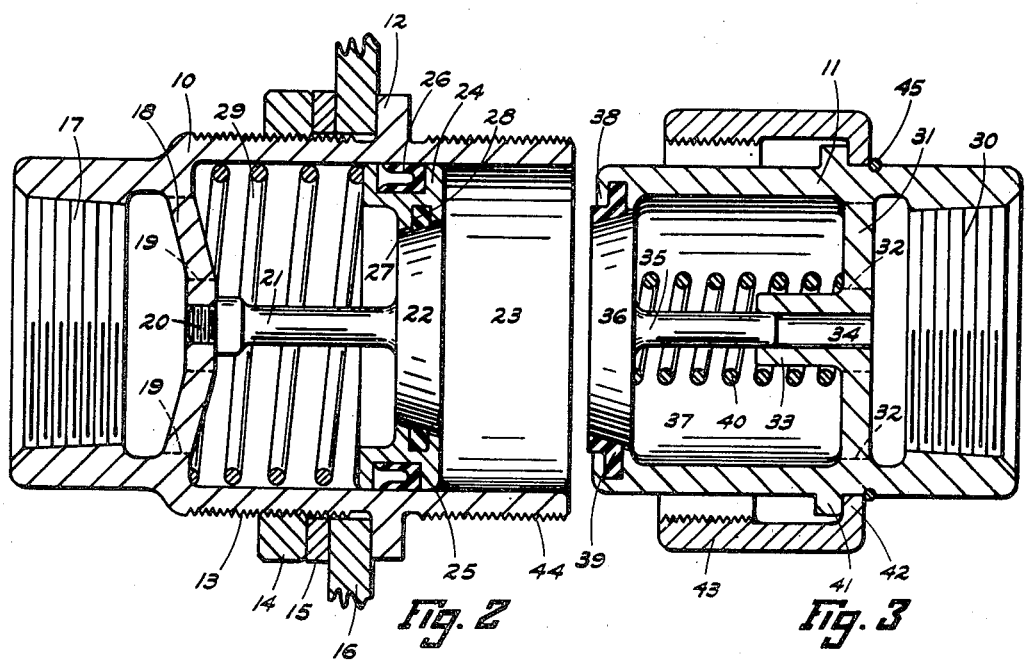
Figs. 2 and 3 are similar to Fig. 1 showing the two parts of the coupling in a disconnected or inoperative position.

As shown in the drawing, the coupling generally includes two parts or members hereinafter referred to as a sleeve member 10 and a plug member 11. Intermediate its ends, the sleeve 10 is provided with an external flange 12 and an externally threaded portion 13 on which is mounted a nut 14 and a washer 15. In practice the sleeve member 10 is generally mounted on a dashboard or the like represented in the drawing by 16, which is clamped between the flange 12 and the washer 15 by means of the nut 14. One end of the sleeve 10 is internally threaded as at 17 to fit over a threaded pipe or the like, it being understood, however, that the threaded portion 17 might well be replaced by an externally threaded portion to fit within the end of a correspondingly threaded pipe. Adjacent the inner end of the threaded portion 17, the sleeve member 10 is provided with a rigid partition 18 having a plurality of apertures 19 extending longitudinally therethrough. Carried by the partition 18 by means of a screw threaded connection 20, there is a stem 21 which extends centrally from the partition into the sleeve member 10 and is terminated by a head or valve 22. The interior of the sleeve member 10, between the partition 18 and the end of the sleeve remote from the threaded portion 17, forms a cylindrical chamber 23 within which is slidably mounted a ring 24 having its peripheral wall provided with a circular groove 25 within which is mounted a packing 26 affording a fluid tight joint between the ring and the inner wall of the chamber 23. The bore through the ring 24 forms a taper valve seat 27 adapted to receive the head or valve 22 which is correspondingly shaped to fit closely therein. In order to assure a fluid tight joint between the seat 27 and valve 22, the seat carries a resilient packing ring 28 engageable by the valve 22. The ring 24 is constantly urged toward the valve 22 by means of a compression spring 29 located between the partition 18 and the ring 24.

The plug member 11, like the sleeve member 10, has its outer end also provided with a threaded bore 30 for connecting that member to the end of a threaded pipe or conduit. Adjacent the inner end of this bore 30, there is also provided a partition 31 having a plurality of apertures or ports 32 extending longitudinally therethrough and a central boss 33 projecting inwardly therefrom. A bore 34 extends through the partition 31 and boss 33 and has slidably mounted therein the stem 35 of a valve 36. The interior of the plug member 11 between the partition 31 and the end of the plug remote from the threaded bore 30 is machined to form a chamber 37 within which the valve 36 is free to slide. This chamber is terminated by an inturned end 38 of the member 11 within which is mounted an annular packing forming a resilient taper valve seat 39 adapted to receive the valve 36 which is correspondingly shaped to fit closely therein in fluid tight relation. Constantly urging the valve 36 toward its valve seat 39, there is a compression spring 40 located between the partition 31 and valve 36. In practice, the packing or seat 39 preferably extends beyond the extreme end of the plug member 11 to form a seal with the ring 24 as will be explained later. Intermediate its ends, the plug member 11 is also provided with a flange 41 against one side of which rests the inturned end 42 of a union or sleeve nut 43 surrounding the plug member 11. To prevent axial movement of the nut relative to the plug, the latter carries a spring clip 45 adjacent the flange 41 and resting against the inturned end 42 of the nut 43. The nut 43 is of an internal size adapted to fit on an externally threaded portion 44 of the sleeve 10.

When it is desired to connect the two parts of the coupling, that is the sleeve 10 and plug 11, the plug is inserted within the chamber 23 and the nut 43 screwed on the portion 44 on the sleeve until the flange 41 of the plug reaches the extreme inner end of the sleeve as clearly shown in Fig. 1. During this process, the stationary valve 22 carried by the sleeve 10 will contact the slidable valve 36 to force it away from the stationary valve seat 39 by compressing the spring 40. Concurrently, the inner end of the plug 11, or more specifically the end of the packing 39 protruding from the plug member 11, will engage the slidable ring 24 or valve seat 27 within the chamber 23 of the sleeve 10 and force this seat away from its stationary valve 22 by compressing the spring 29, thus resulting, during the coupled position of the parts 10 and 11, in the position of the valves 22 and 36 within the chamber 37.

In the coupled position of the parts 10 and 11, it is obvious that the fluid is free to flow through the apertures 19 and 32 of the partitions 18 and 31 respectively, through the valve seats 27 and 39 and pass the now abutting valves 22 and 36. It will also be observed that the fluid pressure within the part 10 will act on the inner end surface of the slidable ring or valve seat 24 to cooperate with the spring 29 in urging the valve seat toward its stationary valve 22.

When it is desired to disconnect the coupling or the ends of the conduits on which the coupling members are mounted, the union nut 43 may be unscrewed to cause separation of the members 10 and 11. In this instance, the valve seat 27 of the member 10 will gradually be moved into engagement with its valve 22 due to the efforts of the compression spring 29 and of the fluid pressure active on the inner end face of the ring 24, while the valve 36 will through the efforts of the compression spring 40 be gradually moved into operative engagement with its valve seat 39, thereby entirely and positively closing the end of the sleeve member 10 as well as that of the plug member 11. The valve seats 28 and 39 form a portion of a cone corresponding in size to that of the valves 22 and 36 when in abutting position as shown in Fig. 1, thereby enabling the valve seat 39 to pass the valve 22 without interference, its smaller diameter being, of course, greater than the largest diameter of the valve 22. Since in the operative position, the two valves 22 and 36 are abutting each other and remain in that position until the valve 22 is engaged by its seat 25 and the valve 36 by its seat 39, it is clear that upon disconnection of the coupling loss of fluid is impossible since both the interior of the sleeve member 10 and plug member 11 are sealed from the exterior prior to the separation of the valves 22 and 36.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A pipe coupling comprising two detachably connected hollowed parts, an apertured partition within one part having a spring pressed valve slidably carried thereby, a stationary valve seat within said part adapted to coact with said valve for closing said part upon disconnection of said parts, an apertured partition within the other part having a stationary valve carried thereby engageable with the slidable valve to open it relative to said stationary seat during connection of said parts, and a slidable spring pressed valve seat within said other part engageable with said stationary valve for closing said other part upon disconnection of said parts, said slidable valve seat having an area subject to fluid pressure within said other part urging the valve seat toward said stationary valve and being moved away from said stationary valve by the first part during connection of said parts.

2. A pipe coupling comprising two detachably connected hollowed parts, an apertured partition within one part having a spring pressed valve slidably carried thereby, a stationary valve seat within said part adapted to coact with said valve for closing said part upon disconnection of said parts, an apertured partition within the other part having a stationary valve carried thereby engageable with the slidable valve to open it relative to said stationary seat during connection of said parts, a slidable spring pressed valve seat within said other part engageable with said stationary valve for closing said other part engageable with said stationary valve for closing said other part upon disconnection of said parts, said slidable valve seat having an area subject to fluid pressure within said other part urging the valve seat toward said stationary valve and being moved away from said stationary valve by the first part during connection of said parts, and packing means carried by said slidable seat affording a fluid tight slidable joint between said seat and other part.

3. A pipe coupling comprising two detachably connected parts, a spring pressed slidable valve within one part, a stationary valve seat within said part adapted to coact with said valve for closing said part upon disconnection of said parts, a partition within the other part, a stationary valve having a stem rigidly carried by said partition, ports through said partition exteriorly of said stem, said stationary valve being engageable with said slidable valve to open it relative to said stationary seat during connection of said parts, and a slidable spring pressed valve seat within said other part engageable with said stationary valve for closing said other part upon disconnection of said parts, said slidable seat having an area subject to fluid pressure within said other part urging the valve seat toward said stationary valve and being moved away from said stationary valve by the first part during connection of said parts.

4. A pipe coupling comprising two detachably connected hollowed parts, a pipe connection for each of said parts, a partition within one part having a spring pressed valve slidably carried thereby, a stationary valve seat within said part adapted to coact with said valve for closing said part upon disconnection of said parts, fluid conveying means within said part exteriorly of said valve leading from said seat to the pipe connection including ports through said partition, a partition within the other part having a stationary valve carried thereby engageable with the slidable valve to open it relative to said stationary seat during connection of said parts, a slidable spring pressed valve seat within said other part engageable with said stationary valve for closing said other part upon disconnection of said parts, said slidable valve seat having an area subject to fluid pressure within said other part urging the valve seat toward said stationary valve and being moved away from said stationary valve by the first part during connection of said parts, and fluid conveying means within said other part exteriorly of said valve leading from said slidable seat to the pipe connection including ports through the partition of said other part.

LLOYD G. SPETH.